Figure 1:
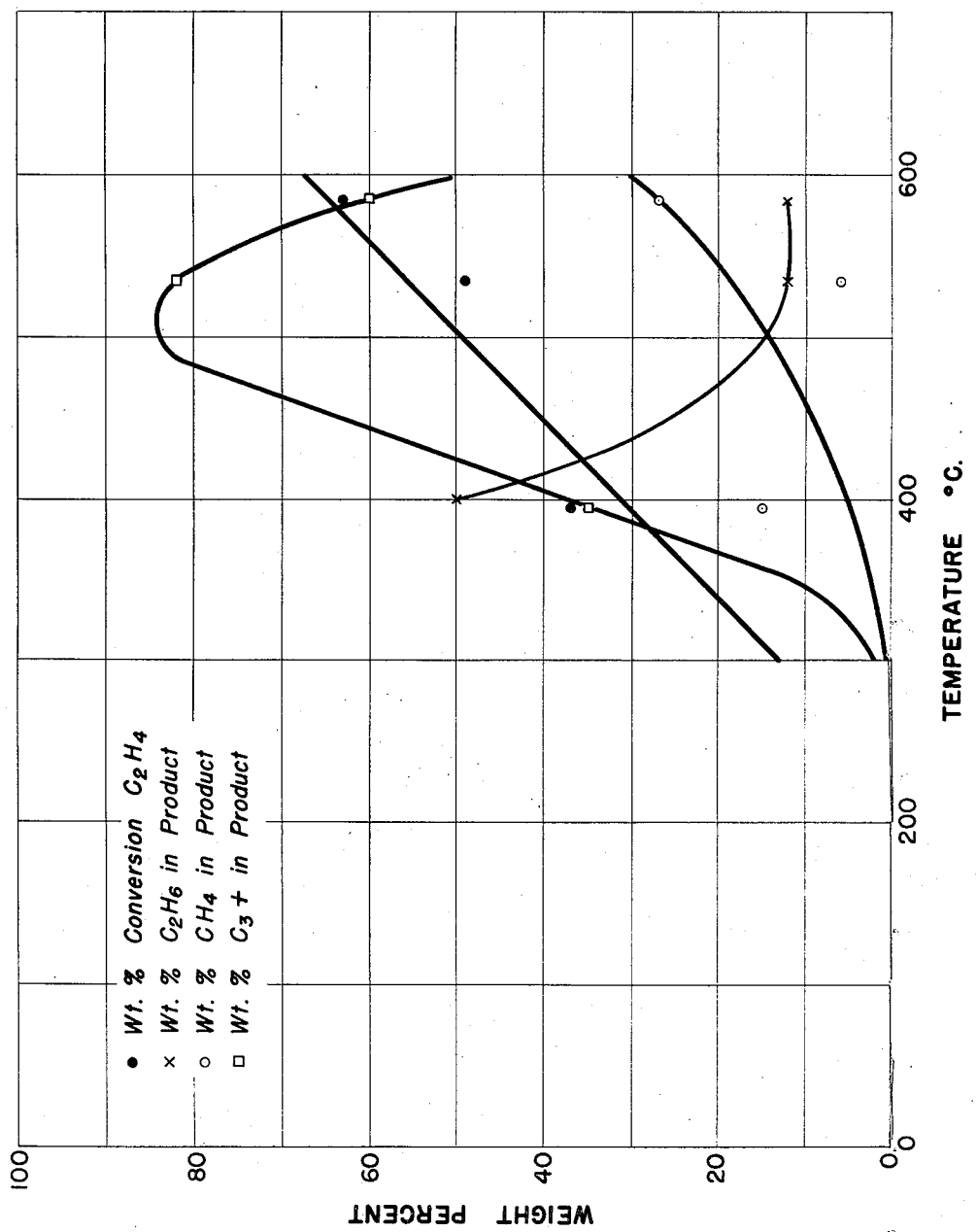

INVENTORS:
Bernard L. Evering
Edwin F. Peters
BY: *Sam B. Becker*
ATTORNEY

INVENTORS:
Bernard L. Evering
Edwin F. Peters
BY: ATTORNEY

INVENTORS:
Bernard L. Evering
Edwin F. Peters

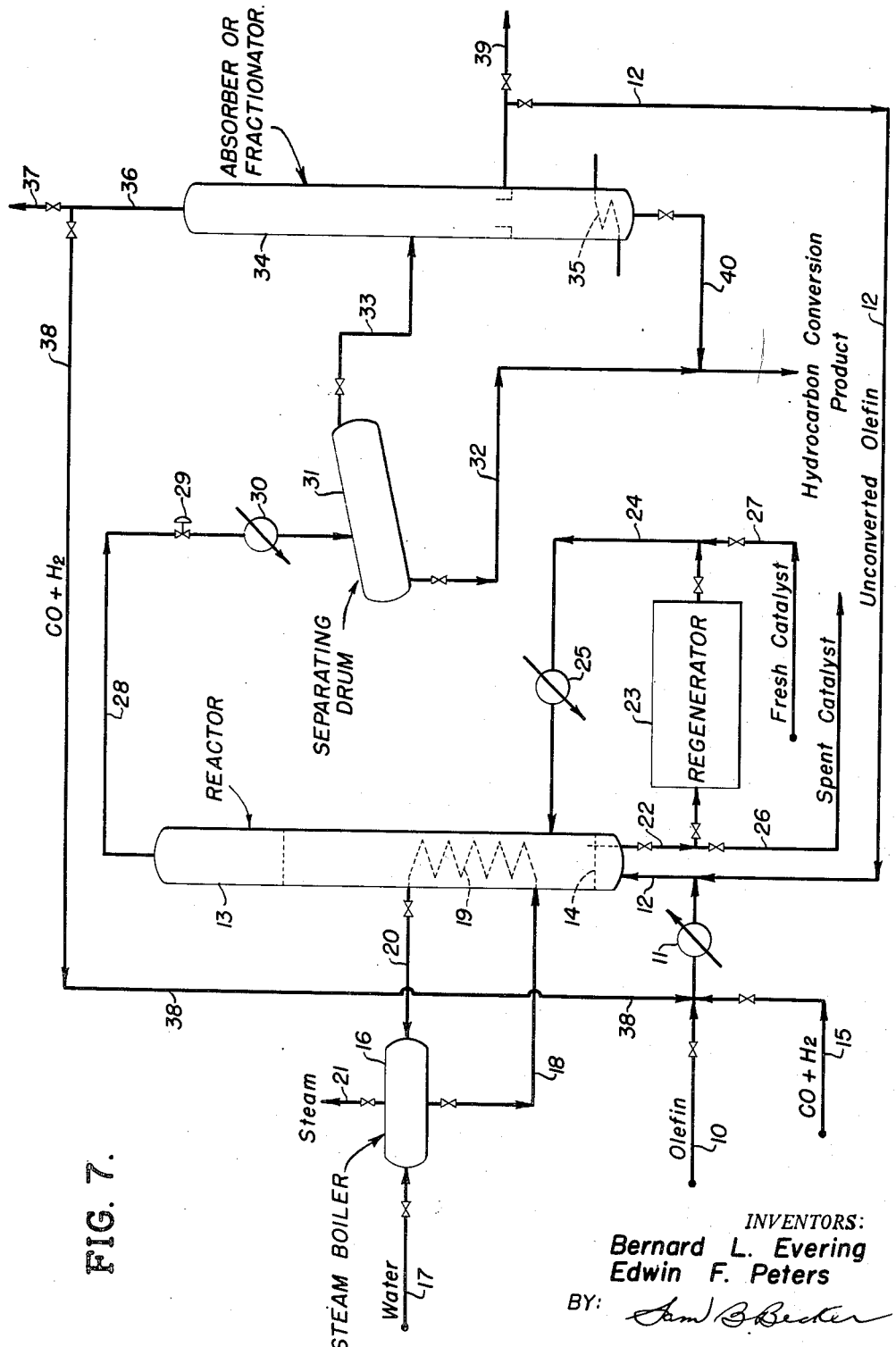

Patented Aug. 12, 1952

2,606,939

UNITED STATES PATENT OFFICE 2,606,939

CONVERSION OF OLEFINS, CARBON MONOXIDE, AND HYDROGEN

Bernard L. Evering and Edwin F. Peters, Chicago, Ill., assignors to Standard Oil Company, Chicago, Ill., a corporation of Indiana Application June 25, 1949, Serial No. 101,462

9 Claims. (Cl. 260—683.15)

1

This invention relates to a novel method for the conversion of olefins in the presence of catalysts containing iron as an essential component. More particularly, it relates to a process for the conversion of mono-olefinic hydrocarbons to hydrocarbons, particularly olefins containing a greater number of carbon atoms per molecule than the olefinic feed stock, by processing said feed stock with carbon monoxide and hydrogen in the presence of catalysts comprising iron as the principal component.

Some study has heretofore been devoted to the possibility of using iron catalysts to polymerize or otherwise convert mono-olefinic hydrocarbons, particularly ethylene, to higher hydrocarbons in the presence of iron catalysts. These studies led to the conclusions that iron catalysts exhibited little or none of the desired catalytic activity and their use led merely to rapid decomposition of the olefinic charging stock to produce hydrogen and carbon, resulting in rapid fouling of the catalyst and reaction tubes (H. W. Walker, J. Phys. Chem. 31, 961–996 (1927), especially pages 987, 992 and 993). The treatment of ethylene with hydrogen in the presence of iron catalysts has been shown to yield large proportions of methane and ethane, along with some liquid olefin polymers (V. N. Ipatieff, "Catalytic Reactions at High Pressures and Temperatures," Macmillan Co., N. Y., 1936, pp. 113–118). A previous attempt to effect interaction between ethylene, carbon monoxide and hydrogen in the presence of an iron-copper catalyst resulted in no conversion of the ethylene, although the carbon monoxide and hydrogen participated in a Fischer-Tropsch reaction (Smith, Hawk and Golden, J. Am. Chem. Soc. 52, 3221 (1930), especially pages 3229 and 3230).

One object of our invention is to provide a process utilizing catalysts comprising essentially iron for the conversion of olefinic hydrocarbons to hydrocarbons, particularly olefins, containing a greater number of carbon atoms per molecule than the olefinic feed stock. Another object of our invention is to provide a process for the polymerization and/or hydropolymerization of mono-olefinic hydrocarbons in the presence of catalysts comprising essentially iron under conditions

2 which maximize the formation of the desired hydrocarbon conversion products and minimize the production of hydrogen and carbon.

Still another object of our invention is to provide a process for the conversion of normally gaseous olefins, particularly non-tertiary olefins, to hydrocarbon products of higher molecular weight and predominantly straight chain structure by treatment with carbon monoxide and hydrogen under selected operating conditions in the presence of catalysts comprising essentially iron. A further object of our invention is to provide methods for increasing the life of catalysts comprising essentially iron during conversion of mono-olefinic hydrocarbons in their presence. These and other objects of our invention will be apparent from the ensuing description thereof, read in connection with the appended figures.

Briefly, the present invention relates to a process for the simultaneous conversion of olefinic hydrocarbons, particularly normally gaseous, non-tertiary olefins, carbon monoxide and hydrogen to produce predominantly hydrocarbon products containing a greater number of carbon atoms per molecule than the olefinic charging stock in the presence of iron-type catalysts under selected operating conditions under which uncontrolled decomposition of the charging stock to produce principally carbon and hydrogen is substantially averted.

The process of our invention will be readily understood by reference to the following specific examples which are intended to be illustrative but not unduly limitative.

Figure 1 graphically presents information obtained by polymerizing ethylene in the presence of a reduced iron catalyst at various temperatures and a reaction pressure of 1100 p. s. i. g. It will be noted from this figure and the tabulated data below that substantial conversion of ethylene was obtained particularly at temperatures between about 450° and 600° C. In this temperature range, considerable production of methane was evident. Also, it appeared that only a relatively short catalyst life could be expected in this operation.

Figure 2:
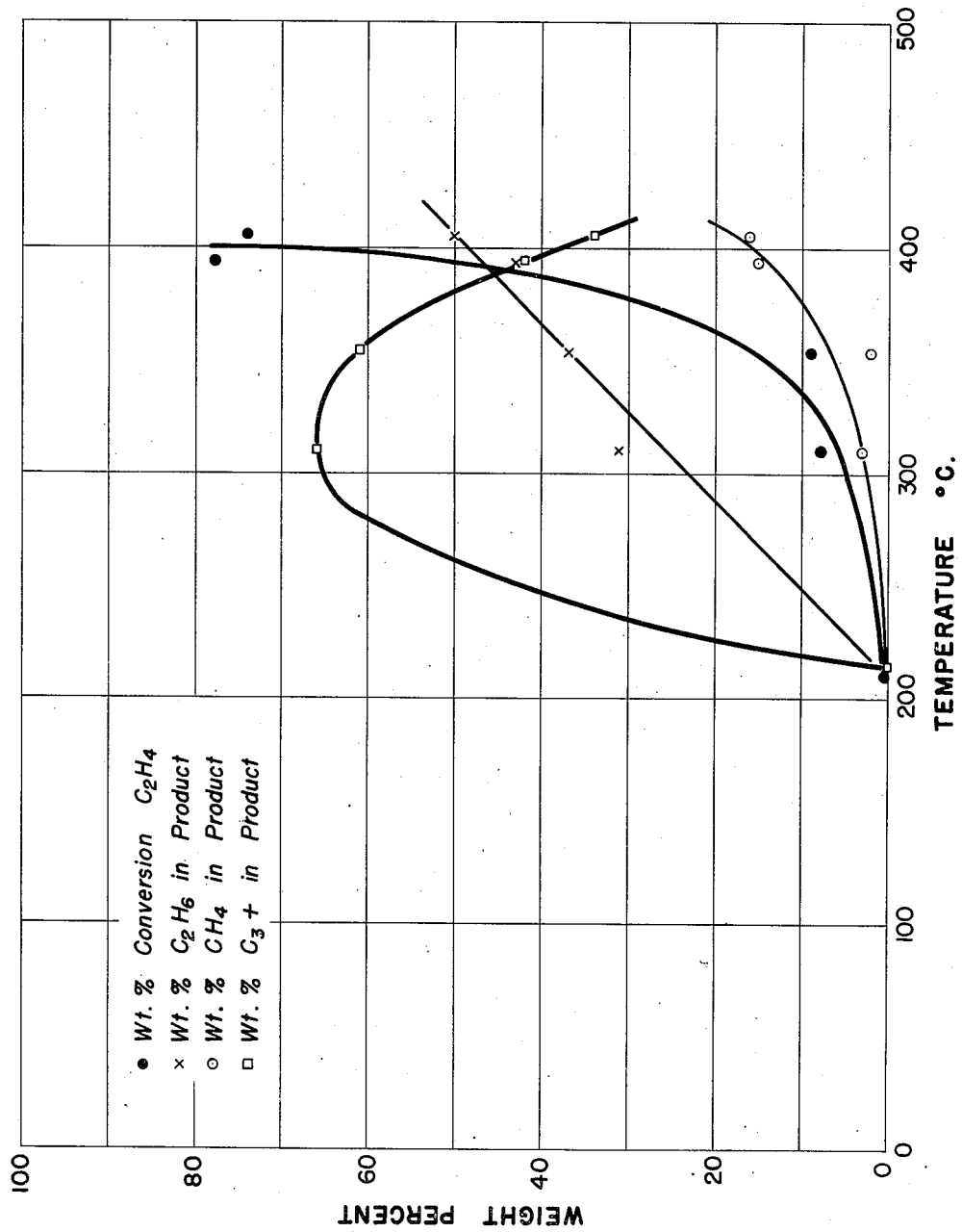

Figure 2 graphically presents yield and conversion information obtained by treatment of ethylene at various temperatures, and a pressure of 720 p. s. i. g. in the presence of a reduced iron catalyst containing about 0.5 weight percent $K_2O$. It will be noted by comparison with Figure 1 that the alkalized iron catalyst was somewhat more active than iron alone, the rate of ethylene conversion increasing rapidly to a value between 74 and 78 weight percent at a temperature of about 400° C. It will be noted, however, that the catalyst functions principally to convert ethylene to ethane by hydrogen transfer, especially under conditions of substantial conversion of the ethylene feed stock. Thus, it will be noted that at about 400° C. substantial conversion of ethylene was obtained but that the reaction of hydrogen transfer predominated over the conversion of ethylene to hydrocarbon products containing three or more carbon atoms per molecule.

Figure 3:
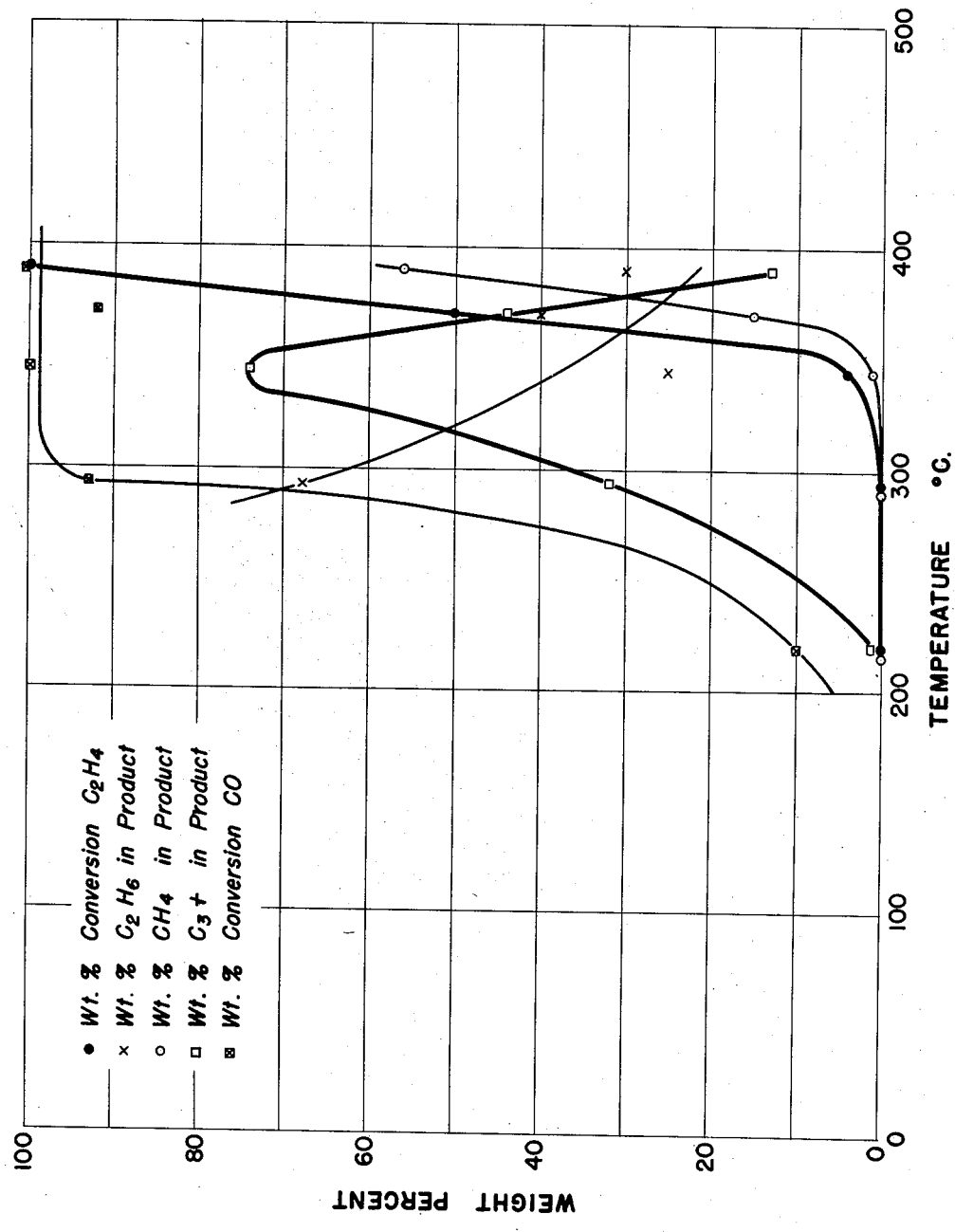

Figure 3 presents information obtained by charging carbon monoxide with ethylene over an alkalized iron catalyst containing 0.5 weight percent of $K_2O$ at 1000 p. s. i. g. and various temperatures. It will be noted from Figure 3 and the following tabulated data that ethylene conversion increased rapidly at about 350° C. from a value of about 12 to 100% at 390° C. However, in the temperature range in which substantial ethylene conversion was being obtained, the undesirable reaction of hydrogen transfer to produce ethane was likewise proceeding substantially, i. e. to the extent of producing about 25 to 40 weight percent of ethane in the product stream. It will also be noted from Figure 3 and the tabulated data that increased ethylene conversion coincided with a marked decrease in the production of $C_3$ and higher molecular weight hydrocarbons. Although carbon monoxide conversion was essentially quantitative at temperatures between about 300° and 400° C., it will be noted that the presence of carbon monoxide did not desirably affect the product distribution.

Figure 4:
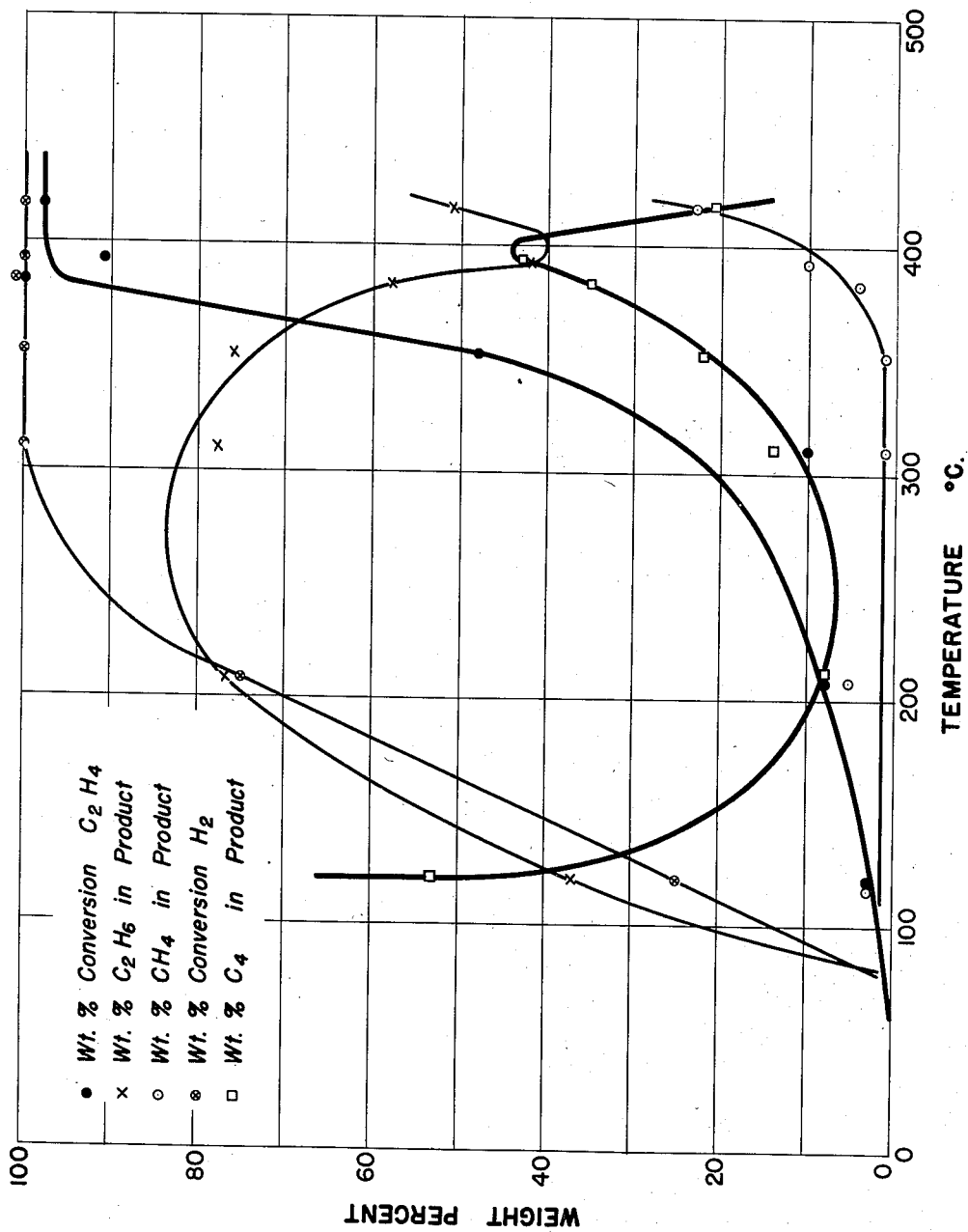

The conversion of a mixture of ethylene (93.4 mol percent) and hydrogen (5.4 mol percent) was effected over an alkalized iron catalyst at 1200 p. s. i. g. and temperatures varying between 120 and 417° C. Although extensive conversion of ethylene occurred in the temperature interval of 350 to 400° C., it will be noted from the curves in Figure 4 and by the supporting data in the table that the single predominating reaction resulted in the production of ethane.

Figure 5:
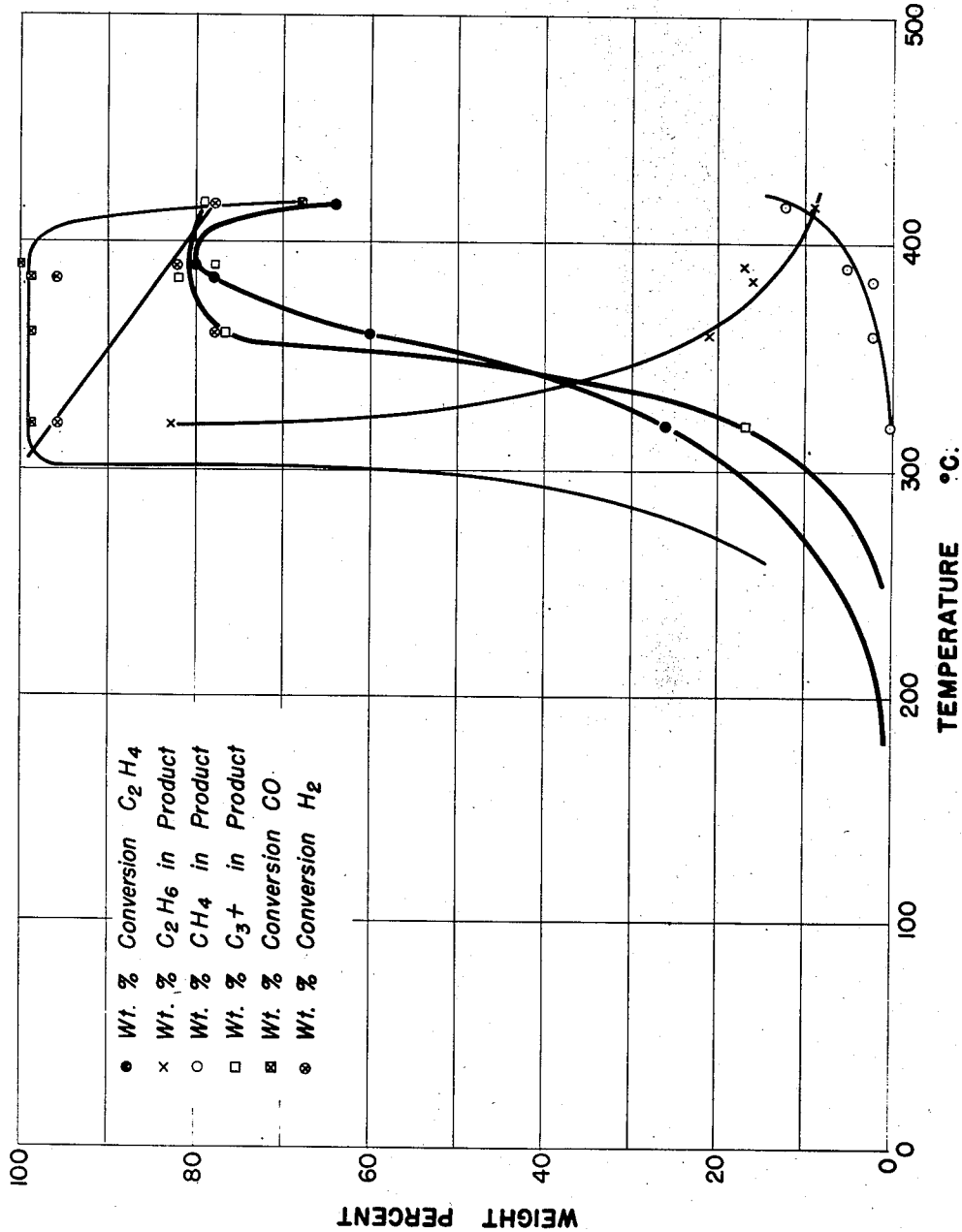

The data graphically presented in Figure 5 are in marked contrast to the data of Figures 1 to 4. Figure 5 presents information obtained by the co-conversion of ethylene, carbon monoxide and hydrogen in contact with an iron catalyst containing 0.5 weight percent $K_2O$ at 1150 p. s. i. g. and various temperatures. The $H_2$:Co mol ratio was about 4.8. It will be noted that maximum conversion of ethylene was obtained at temperatures between about 350° C. and about 425° C., under which conditions the carbon monoxide is completely converted, together with most of the hydrogen charged to the reactor. Coincident with maximum ethylene conversion, only a relatively small proportion of the ethylene is converted to ethane, and methane production is likewise at a low level. The yield of $C_3$ and higher hydrocarbon products rises sharply with increased ethylene conversion and, in fact, attains a maximum over the temperature range of about 360° to 425° C.

Surprisingly, the $H_2$:CO molar conversion ratio was far in excess of that obtained with iron catalysts in the Fischer-Tropsch synthesis but the production of oxygenated compounds was quite low. The oxygen content of 1.36 weight percent in the product corresponds to about 10 weight percent of oxy compounds calculated as octanol. The present synthesis was also sharply distinguishable from the Fischer-Tropsch synthesis not only by the composition of the charging stock and operating conditions, but also by the fact that at most 1 or 2 weight percent of water was produced by the reaction, whereas in the Fischer-Tropsch synthesis it frequently happens that as much as about 50 mol percent of the oxygen content of the CO charged is converted to water.

Figure 6:
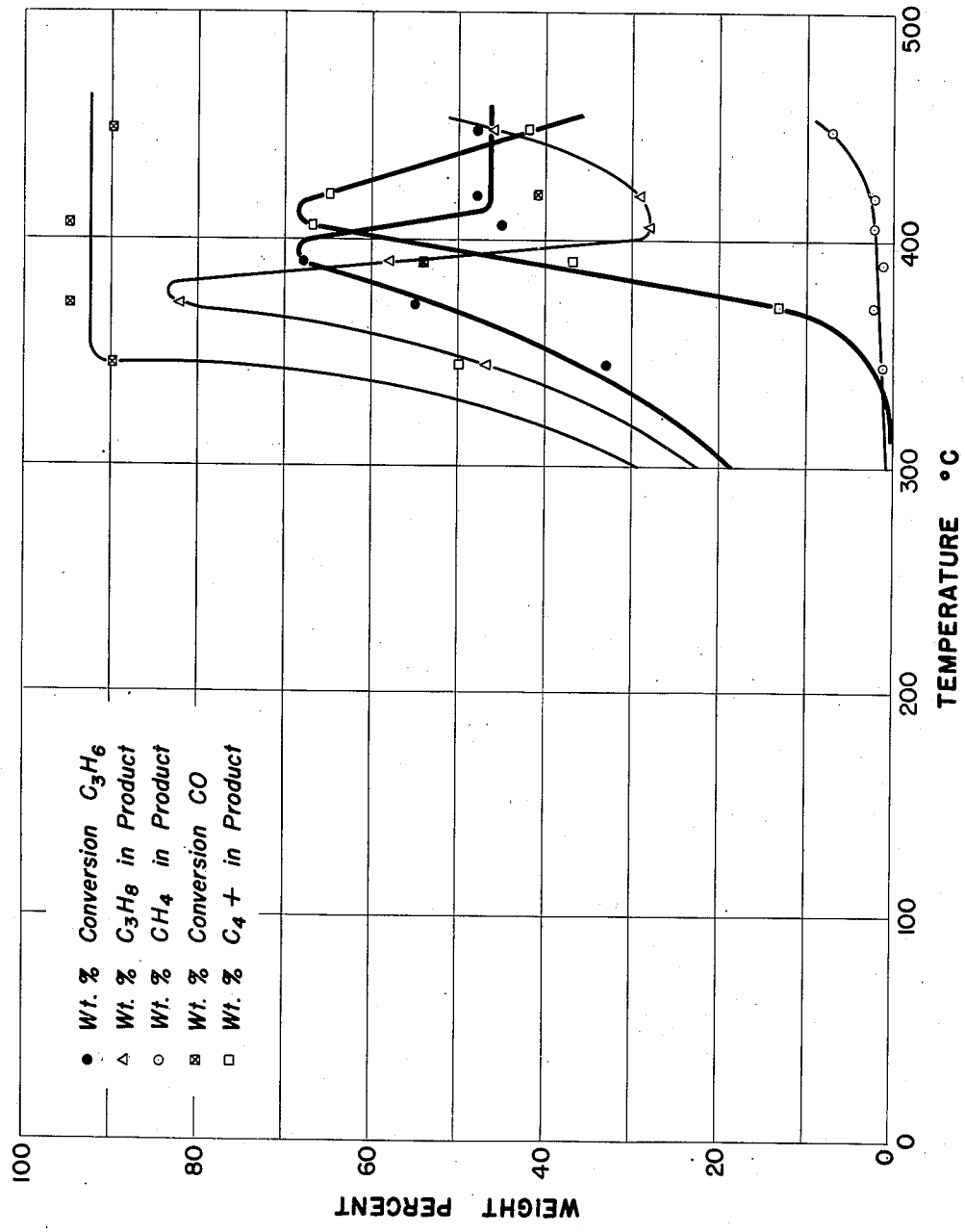

Figure 6 is a plot of data obtained by the conversion of a mixture of propylene (89 mol percent), carbon monoxide (5.3 mol percent) and hydrogen (3.8 mol percent) in the presence of an alkalized iron catalyst at 1100 p. s. i. g. and temperatures from 346 to 448° C. It will be noted that hydrogenation reactions leading to the production of propane are minimized under the conditions of maximum conversion of the propylene and that the conversion of propylene to $C_4$ and higher hydrocarbons closely parallels the propylene conversion curve under conditions of maximum conversion. Essentially quantitative conversion of carbon monoxide is obtained under conditions of maximum propylene conversion and methane production is low and unimportant under these conditions.

The tables below present the experimental data which have been graphically presented in Figures 1 to 6.

| | Polymerization of Ethylene over Unalkalized Iron (Fig. 1) | | |
|---|---|---|---|
| Experiment Number | 129 | | |
| Catalyst Charge, gms.: | | | |
| Iron | 413 | 413 | 413 |
| $K_2O$ | 0 | 0 | 0 |
| Total | 413 | 413 | 413 |
| Feed Charge, gms.: | | | |
| Ethylene | 48 | 224 | 370 |
| Carbon Monoxide | 0 | 0 | 0 |
| Hydrogen | 0 | 0 | 0 |
| Experimental Conditions: | | | |
| Temperature, °C | 395 | 535 | 585 |
| Pressure, p. s. i. g | 1,100 | 1,100 | 1,100 |
| S. V. gms. Feed/gm. Catalyst/hr | 0.076 | 0.218 | 0.328 |
| Conversion of Feed, weight percent | 37 | 49 | 63 |
| Conversion of Ethylene, weight percent | 37 | 49 | 63 |
| Conversion of Carbon Monoxide, weight percent | ----- | ----- | ----- |
| Conversion of Hydrogen, weight percent | ----- | ----- | ----- |
| Composition of Product, weight percent: | | | |
| Hydrogen | 0 | 0 | 1 |
| Methane | 15 | 6 | 27 |
| Ethane | 50 | 12 | 12 |
| Propylene | 1 | 16 | 7 |
| Propane | 3 | 5 | 3 |
| Butenes | 3 | 22 | 19 |
| Butanes | 2 | 6 | 6 |
| Pentenes and Higher | 26 | 33 | 25 |
| Total | 100 | 100 | 100 |
| Composition of $C_5$ + Product weight percent: | | | |
| $C_5$ | | 12 | |
| $C_6$ | | 18 | |
| $C_7$ | | 21 | |
| $C_8$ | | 13 | |
| $C_9$ | | 9 | |
| Btms | | 27 | |
| Total | | 100 | |
| Weight percent Oxygen as (O=16) in $C_5$+ | | ----- | |
| Percent Unsaturation $C_5$-$C_9$ cuts | | 50-70 | |

| | Polymerization of Ethylene over Alkalized Iron (Fig. 2) | | | |
|---|---|---|---|---|
| Experiment Number | 123 | | | |
| Catalyst Charge, gms.: | | | | |
| Iron | 344 | 344 | 344 | 344 |
| $K_2O$ | 2 | 2 | 2 | 2 |
| Total | 346 | 346 | 346 | 346 |
| Feed Charge, gms.: | | | | |
| Ethylene | 51 | 105 | 85 | 98 |
| Carbon Monoxide | 0 | 0 | 0 | 0 |
| Hydrogen | 0 | 0 | 0 | 0 |
| Experimental Conditions: | | | | |
| Temperature, °C | 310 | 355 | 395 | 405 |
| Pressure, p. s. i. g | 720 | 720 | 720 | 720 |
| S. V. gms. Feed/gm. Catalyst/hr | 0.074 | 0.087 | 0.123 | 0.114 |
| Conversion of Feed, weight percent | 8 | 9 | 78 | 74 |
| Conversion of Ethylene, weight percent | 8 | 9 | 78 | 74 |
| Conversion of Carbon Monoxide, weight percent | ----- | ----- | ----- | ----- |
| Conversion of Hydrogen, weight percent | ----- | ----- | ----- | ----- |
| Composition of product, weight percent: | | | | |
| Hydrogen | 0 | 0 | 0 | 0 |
| Methane | 3 | 2 | 15 | 16 |
| Ethane | 31 | 37 | 43 | 50 |
| Propylene | 0 | 0 | 4 | 5 |
| Propane | 0 | 0 | 2 | 2 |
| Butenes | 49 | 34 | 6 | 5 |
| Butanes | 3 | 4 | 2 | 2 |
| Pentenes and Higher | 14 | 23 | 28 | 20 |
| Total | 100 | 100 | 100 | 100 |
| Composition of $C_5$+ Product weight percent: | | | | |
| $C_5$ | | 8 | | |
| $C_6$ | | 20 | | |
| $C_7$ | | 8 | | |
| $C_8$ | | 14 | | |
| $C_9$ | | 18 | | |
| Btms | | 32 | | |
| Total | | 100 | | |
| Weight percent Oxygen as (O=16) in $C_5$+ | | ----- | | |
| Percent Unsaturation $C_5$-$C_9$ cuts | | 50-70 | | |

| | Polymerization of $C_2H_4$-CO over Alkalized Iron (Fig. 3) | | | |
|---|---|---|---|---|
| Experiment Number | 124 | | | |
| Catalyst Charge, gms.: | | | | |
| Iron | 344 | 344 | 344 | 344 |
| $K_2O$ | 2 | 2 | 2 | 2 |
| Total | 346 | 346 | 346 | 346 |
| Feed Charge, gms.: | | | | |
| Ethylene | 53 | 65 | 254 | 157 |
| Carbon Monoxide | 4 | 5 | 20 | 13 |
| Hydrogen | 0 | 0 | 0 | 0 |
| Experimental Conditions: | | | | |
| Temperature, °C | 295 | 345 | 370 | 390 |
| Pressure, p. s. i. g | 1,000 | 1,000 | 1,000 | 1,000 |
| S. V. gms. Feed/gm. Catalyst/hr | 0.082 | 0.101 | 0.143 | 0.248 |
| Conversion of Feed, weight percent | 1 | 12 | 54 | 100 |
| Conversion of Ethylene, weight percent | 0 | 4 | 50 | 100 |
| Conversion of Carbon Monoxide, weight percent | 93 | 100 | 92 | 100 |
| Conversion of Hydrogen, weight percent | ----- | ----- | ----- | ----- |
| Composition of Product, weight percent: | | | | |
| Hydrogen | 0 | 0 | 1 | 1 |
| Methane | 0 | 1 | 15 | 56 |
| Ethane | 68 | 25 | 40 | 30 |
| Propylene | 6 | 1 | 1 | 1 |
| Propane | 6 | 1 | 0 | 7 |
| Butenes | 16 | 17 | 2 | 0 |
| Butanes | 4 | 6 | 1 | 2 |
| Pentenes and Higher | 0 | 49 | 40 | 3 |
| Total | 100 | 100 | 100 | 100 |
| Composition of $C_5$ + Product weight percent: | | | | |
| $C_5$ | | 3 | | |
| $C_6$ | | 13 | | |
| $C_7$ | | 9 | | |
| $C_8$ | | 15 | | |
| $C_9$ | | 8 | | |
| Btms | | 52 | | |
| Total | | 100 | | |
| Weight percent Oxygen as (O=16) in $C_5$ + | | ----- | | |
| Percent Unsaturation $C_5$-$C_9$ cuts | | 50-70 | | |

| | Polymerization of Ethylene-Hydrogen Mixture over Alkalized Iron (Fig. 4) | | | | | | |
|---|---|---|---|---|---|---|---|
| Experiment Number | 138 | | | | | | |
| Catalyst charge in g.: | | | | | | | |
| Iron | 350 | 350 | 350 | 350 | 350 | 350 | 350 |
| Alkali $K_2O$ | 1.7 | 1.7 | 1.7 | 1.7 | 1.7 | 1.7 | .17 |
| Total | 351.7 | 351.7 | 351.7 | 351.7 | 351.7 | 351.7 | 351.7 |
| Feed Composition, weight percent: | | | | | | | |
| $H_2$ | 0.5 | 0.5 | 0.5 | 0.5 | 0.5 | 0.5 | 0.5 |
| $C_2H_4$ | 99.5 | 99.5 | 99.5 | 99.5 | 99.5 | 99.5 | 99.5 |
| Operating Conditions: | | | | | | | |
| Temperature, °C | 120 | 208 | 311 | 352 | 384 | 393 | 417 |
| Pressure, p. s. i. g | 1,200 | 1,200 | 1,200 | 1,200 | 1,200 | 1,200 | 1,200 |
| S. V. g. HC/ g. Cat. /hr | 0.02 | 0.03 | 0.05 | 0.06 | 0.10 | 0.17 | 0.08 |
| Conversion $C_2H_4$, weight percent | 3 | 8 | 10 | 48 | 100 | 91 | 98 |
| Conversion $H_2$, weight percent | 25 | 75 | 100 | 100 | 100 | 100 | 100 |
| Composition of Product, weight percent: | | | | | | | |
| $H_2$ | 0 | 0 | 0 | 0 | 0 | 0 | 0 |
| $CH_4$ | 3 | 5 | 1 | 1 | 4 | 10 | 23 |
| $C_2H_4$ | -- | -- | -- | -- | -- | -- | -- |
| $C_2H_6$ | 37 | 77 | 78 | 76 | 58 | 42 | 51 |
| $C_3H_6$ | 0 | 0 | 0 | 1 | 1 | 3 | 1 |
| $C_3H_8$ | 7 | 10 | 7 | 0 | 2 | 3 | 4 |
| $C_4H_8$ | 20 | 2 | 6 | 8 | 3 | 3 | 1 |
| $C_4H_{10}$ | 13 | 2 | 0 | 5 | 3 | 2 | 2 |
| $C_5+$ | 20 | 4 | 8 | 9 | 29 | 37 | 18 |

| Composition of Combined $C_5+$ Product, weight percent | Total | Percent Unsaturates |
|---|---|---|
| $C_5$ | 11 | 62 |
| $C_6$ | 18 | 61 |
| $C_7$ | 9 | 65 |
| $C_8$ | 14 | 60 |
| $C_9$ | 10 | 65 |
| Btms | 38 | 62 |
| Total | 100 | ---- |

| | Polymerization of $C_2H_4$-CO-$H_2$ over Alkalized Iron (Fig. 5) | | | | |
|---|---|---|---|---|---|
| Experiment number | 125 | | | | |
| Catalyst charge, gms.: | | | | | |
| Iron | 225 | 225 | 225 | 225 | 225 |
| $K_2O$ | 1 | 1 | 1 | 1 | 1 |
| Total | 226 | 226 | 226 | 226 | 226 |
| Feed Charge, gms.: | | | | | |
| Ethylene | 10.7 | 20 | 41 | 143.0 | 159 |
| Carbon Monoxide | 1.0 | 2 | 4 | 13.0 | 15 |
| Hydrogen | 0.3 | 0.7 | 1.3 | 4.5 | 5 |
| Experimental Conditions: | | | | | |
| Temperature, °C | 320 | 360 | 385 | 390 | 415 |
| Pressure, p.s.i.g. | 1,150 | 1,150 | 1,150 | 1,150 | 1,150 |
| S.V. gms. Feed/gm. Cat./hr | 0.053 | 0.102 | 0.203 | 0.236 | 0.262 |
| Conversion of Feed, weight percent | 34 | 65 | 80 | 80 | 65 |
| Conversion of Ethylene, weight percent | 26 | 60 | 78 | 80 | 64 |
| Conversion of Carbon Monoxide, weight percent | 99 | 99 | 99 | 100 | 68 |
| Conversion of Hydrogen, weight percent | 96 | 78 | 96 | 82 | 78 |
| Composition of Product, weight percent: | | | | | |
| Hydrogen | 0 | 0 | 0 | 0 | 0 |
| Methane | 0 | 2 | 2 | 5 | 12 |
| Ethane | 83 | 21 | 16 | 17 | 9 |
| Propylene | 0 | 0 | 1 | 1 | 0 |
| Propane | 2 | 0 | 0 | 1 | 1 |
| Butenes | 1 | 3 | 4 | 6 | 1 |
| Butanes | 5 | 2 | 2 | 3 | 1 |
| Pentenes and Higher | 9 | 72 | 75 | 67 | 76 |
| Total | 100 | 100 | 100 | 100 | 100 |

| Composition of $C_5$ + Product weight percent: | |
|---|---|
| $C_5$ | 6 |
| $C_6$ | 14 |
| $C_7$ | 9 |
| $C_8$ | 12 |
| $C_9$ | 12 |
| Btms | 47 |
| Total | 100 |
| Weight percent Oxygen as (O=16) in $C_5+$ | 1.36 |
| Percent Unsaturation $C_5$-$C_9$ | 50-70 |

| | Polymerization of Propylene-Carbon Monoxide-Hydrogen Mixture over Alkalized Iron: Catalyst (Fig. 6) | | | | | |
|---|---|---|---|---|---|---|
| Experiment Number | 139 | | | | | |
| Catalyst charge g.: | | | | | | |
| Iron | 280 | 280 | 280 | 280 | 280 | 280 |
| Alkali (K₂O) | 1.4 | 1.4 | 1.4 | 1.4 | 1.4 | 1.4 |
| Total | 281.4 | 281.4 | 281.4 | 281.4 | 281.4 | 281.4 |
| Feed Composition, weight per cent: | | | | | | |
| H₂ | 0.2 | 0.2 | 0.2 | 0.2 | 0.2 | 0.2 |
| CO | 3.8 | 3.8 | 3.8 | 3.8 | 3.8 | 3.8 |
| C₃H₆ | 96.0 | 96.0 | 96.0 | 96.0 | 96.0 | 96.0 |
| Operating Conditions: | | | | | | |
| Temperature, °C | 346 | 372 | 391 | 407 | 420 | 448 |
| Pressure, p. s. i. g | 1,100 | 1,100 | 1,100 | 1,100 | 1,100 | 1,100 |
| S. V. g. HC/g. Cat./hr | 0.11 | 0.03 | 0.06 | 0.21 | 0.21 | 0.28 |
| Conversion C₃H₆, weight per cent | 33 | 55 | 68 | 45 | 48 | 48 |
| Conversion H₂, weight per cent | 50 | 50 | 50 | 50 | 50 | 1(−50) |
| Conversion CO, weight per cent | 90 | 95 | 54 | 95 | 41 | 90 |
| Composition of Product, weight per cent: | | | | | | |
| H₂ | 0 | 0 | 0 | 0 | 0 | 1 |
| CH₄ | 1 | 2 | 1 | 2 | 2 | 7 |
| C₂H₄ | 1 | 0 | 0 | 1 | 1 | 1 |
| C₂H₆ | 1 | 3 | 4 | 2 | 3 | 3 |
| C₃H₈ | -- | -- | -- | -- | -- | -- |
| C₄H₈ | 47 | 82 | 58 | 28 | 29 | 46 |
| C₄H₁₀ | 0 | 0 | 2 | 5 | 5 | 4 |
| C₅+ | 1 | 2 | 3 | 2 | 2 | 4 |
| | 49 | 11 | 32 | 60 | 58 | 34 |
| Total | 100 | 100 | 100 | 100 | 100 | 100 |
| Composition of Combined C₅+ Product, weight per cent: | | | | | | |
| C₅ | 7 | | | | | |
| C₆ | 28 | | | | | |
| C₇ | 8 | | | | | |
| C₈ | 9 | | | | | |
| C₉ | 20 | | | | | |
| Btms | 28 | | | | | |
| Total | 100 | | | | | |

¹ Represents gain in H₂

In the practice of our invention, we prefer to employ normally gaseous, non-tertiary olefins as feed stocks. We may employ mixtures of different olefins and/or paraffins, such as are frequently produced in petroleum refinery operations. We may also employ normally liquid olefins, such as 1-pentene, 2-pentene and the like, or hydrocarbon mixtures comprising normally gaseous and normally liquid olefins. Isoolefins, such as isobutylene, trimethylethylene and the like are relatively less reactive charging stocks than non-tertiary olefins. Olefinic charging stocks for the purposes of the present invention can be prepared, purified or concentrated by conventional methods which form no part of this invention.

Although certain illustrative ranges of operating conditions have been indicated in the above specific examples, it should be understood that the conditions therein recited are not limitative of the invention. In general, the proportion of carbon monoxide plus hydrogen in the total charging stock to the process may be varied between about 5 and about 40 volume percent. The $H_2$:CO mol ratio may be varied between about 0.5 and about 10 and is preferably between about 1 and about 5. The temperature in the conversion zone may be varied between about 350 and about 425° C., and is preferably between about 375 and about 400° C. The operating pressure may vary between 250 and 2500 p. s. i. g., and is preferably maintained between about 500 and 1000 p. s. i. g. When the catalyst is employed in the form of a fixed bed, the reactants are passed therethrough at a space velocity which may be between about 0.01 and about 0.3 part by weight per hour per part of catalyst, preferably about 0.1 to about 0.2. When the catalyst is employed in the form of a fluidized powder bed, the above-mentioned space velocity can be increased by a factor of about 10.

An illustrative representation of the process of our invention is depicted in the flow diagram, Figure 7. An olefinic hydrocarbon, preferably a normally gaseous, non-tertiary olefin, such as ethylene, propylene, 1-butene or 2-butene, or a mixture of olefins with each other and/or paraffin hydrocarbons, is passed through line 10 and heater 11, thence through line 12 into the lower portion of reactor 13. The olefinic charging stock should be essentially free of sulfur, which can be removed by conventional methods. Reactor 13 is provided with a grid or baffles 14, above which a fluidized bed of iron catalyst powder is maintained. Cyclone separators or filters (not shown) may be provided in the upper portion of the reactor to separate catalyst powder entrained in the gaseous stream leaving the reactor and to return said powder to the fluidized bed in the lower part of the reactor. We may employ, for example, a fluidized solids catalytic reactor such as the one illustrated and described in U. S. Patent 2,347,682.

We may employ iron catalysts such as have heretofore been employed in Fischer-Tropsch hydrocarbon syntheses (note Storch, Chem. Eng. Prog. 44, June 1948, page 469; Latta and Walker, ibid, 44, February 1949, pages 173-6). Thus the catalyst may be a commercial alkalized iron such as the one commonly employed in the conversion of nitrogen and hydrogen to ammonia, which catalyst in the unreduced state consists essentially of $Fe_3O_4$, 2.5% alumina and 0.5% $K_2O$. We may also employ an iron catalyst promoted with iron fluoride, such as the catalyst described in U. S. application for Letters Patent S. N. 794,120 filed by Herman S. Seelig and James Zisson on December 26, 1947, or an iron catalyst prepared by comminution and reduction of mill scale, as described and claimed in S. N. 770,749 filed by Scott W. Walker on August 26, 1947, now U. S. Patent Number 2,485,945. Although iron is the essential or principal component of the catalysts employed in the process of the present invention, it should be understood that other metals, which may or may not exert catalytic effects may be present in the catalysts. Thus the catalysts may contain minor proportions, usually between about 0.1 and about 25 percent by weight of one or more metals other than iron, e. g. copper, cobalt, thorium, manganese, vanadium, etc. The catalyst may be supported on alumina, silica, kieselguhr, acid-treated clays or the like. Alkali metal salts, especially fluorides, or their oxides or carbonates may be employed in amounts between about 0.1 and about 5 weight percent based on the iron to promote the catalyst. The promoters may be added to the iron catalyst not only in the course of preparation but also during the synthesis. The catalyst may be reduced in situ in the reactor.

The catalyst powder may have a particle size between about 100 and 400 mesh and a bulk density between about 10 and 100 pounds or even more per cubic foot in the fluidized condition. Fluidization of the catalyst bed in the reactor is obtained by passing the reactants in the vapor phase therethrough at a vertical vapor velocity between about 0.1 and about 10 feet per second, preferably between about 0.5 and about 2.5 feet per second.

A mixture of carbon monoxide and hydrogen is added to the olefin charging stock through valved lines 15 and 38. The carbon monoxide-hydrogen stream is blended with the olefin charging stock to produce a mixture containing between about 5 and about 40 volume percent of carbon monoxide and hydrogen, for example, about 20 to about 30 volume percent carbon monoxide and hydrogen. The mol ratio of $H_2:CO$ charged to the reactor may be varied between about 0.5 and 10 or even more and may suitably be about 3 to about 5.

A suitable method for producing a mixture of ethylene and/or propylene with carbon monoxide and hydrogen comprises oxidative dehydrogenation or cracking of gas mixtures containing ethane and/or propane, essentially as practiced in Germany (P. B. Report 52,854 by M. A. Matthews). The procedure consists of preheating the hydrocarbon gas stream to 650–680° C., mixing it with oxygen preheated to 450–550° C., using 0.4 to 0.5 mol of oxygen per mol of hydrocarbon, and passing the mixture through a special refractory ceramic reactor at an absolute pressure of 320–360 mm. of mercury. The mixtures of olefins, carbon monoxide and hydrogen thus produced can be blended with further quantities of olefins, if desired, and charged to the present process. Part of the tail gas from the polymerization or conversion operation can be recycled to the oxidative dehydrogenation process.

The reaction which occurs in reactor 13 is highly exothermic. Heat removal may be effected from the reaction zone by the employment of cooling tubes or coils disposed in the dense phase fluidized catalyst bed. The heat removal facilities depicted in Figure 7 comprise a waste steam boiler 16 to which water is charged through valved line 17, passed through valved line 18, through coils or tubes 19 disposed in the dense fluidized catalyst bed, thence through valved line 20 to catalyst bed, thence through valved line 20 to boiler or steam separating drum 16, from which steam is vented through line 21 under controlled pressure.

An aliquot portion of the catalyst may be withdrawn intermittently or continuously through valved line 22 to pass into a regenerator schematically depicted by 23, whence regenerated catalyst passes through valved line 24 and cooler 25 back to the lower portion of the dense phase fluidized catalyst bed in reactor 13. Spent catalyst may be withdrawn from the system through valved line 26 and fresh catalyst may be added through valved line 27.

The regeneration procedures employed are those which have heretofore been employed for the regeneration or reactivation of iron Fischer-Tropsch catalysts and comprise principally treatment with hydrogen, alternate oxidation and reduction of the spent catalyst, extraction of the spent catalyst with wax solvents, etc.

The vaporous or gaseous charging stock is treated in reactor 13 at a temperature between about 350 and about 450° C., usually at a temperature between 375 and 425° C., and pressures between about 250 and 3000 p. s. i. g., usually about 750 to 1500 p. s. i. g. Upon completion of the desired reaction period, the converted stream is passed from the upper portion of reactor 13 through line 28 and pressure reducing valve 29, thence through partial condenser 30 into a separating drum 31.

Suitable conditions to be maintained in separator 31 include a temperature between about 20° C. and about 50° C., and a pressure of about 100 to about 1000 p. s. i. g. Liquid conversion products are withdrawn from the lower portion of separator 31 through valved line 32 and may be subjected to aftertreatment as hereinafter described. Gaseous products are discharged from the separator 31 through valved line 33 and are passed to a zone 34 in which they are treated to recover normally liquid hydrocarbon conversion products entrained in the gas stream. Zone 34 may take the form of an absorber or fractionating column and is depicted in the latter form in Figure 7. A reboiler coil 35 is provided in the lower portion of tower 34. A gas stream comprising principally carbon monoxide and hydrogen, which may also include varying amounts of methane, ethane, ethylene and $C_3$ hydrocarbons, is discharged from the upper end of tower 34 through line 36 whence all or an aliquot portion may be discharged from the system through valved line 37, or all or a part of said stream may be passed through valved line 38 to join the olefinic charging stock passing through valved line 10 into reactor 13. A side-cut consisting essentially of unconverted olefin may be trapped at an intermediate zone in tower 34 and partially or wholly discharged from the system through valved line 39. It is preferred that at least a portion of the unconverted olefin withdrawn from the tower 34 be recycled through valved line 12 to reactor 13 for conversion. Hydrocarbon conversion products containing a greater number of carbon atoms per molecule than the olefinic feed stock are withdrawn from the lower end of tower 34 through valved line 40, whence they are passed to valved line 32 to join the primary stream of hydrocarbon conversion products withdrawn from separator 31.

Although Figure 7 depicts a fluidized catalyst system for the conversion of olefins, carbon monoxide and hydrogen, it will be apparent that the present process is not restricted to the employment of the catalyst in the fluidized powdered form. Thus, we may employ a fixed bed of iron-type catalyst; a fixed catalyst bed was utilized in carrying out the experiments which yielded the data tabulated above. Other methods of contacting catalysts and the reactants are known in the art and may be used for the purposes of the present invention. Thus, we may pass the reactants upwardly against a downflowing stream of catalyst powder or pellets which are removed from the lower end of the reactor and recycled to its upper end by mechanical elevators or by a gas stream, optionally with intermediate regeneration of the catalyst between passes through the reaction chamber.

We may also pass the reactants in the vaporous or gaseous state through an agitated slurry of powdered catalyst in a high-boiling unreactive hydrocarbon oil, withdrawing a portion of the slurry from time to time to separate synthesized products and catalyst. The catalyst may also be maintained as a stationary bed of pellets through which the liquid or liquefied olefin charging stock, or a solution of olefin charging stock in a suitable oil, is passed downwardly against a rising stream or carbon monoxide and hydrogen. In lieu of employing a fluidized fixed bed of powdered catalyst, we may blow a suspension of reactant vapors or gases and powdered catalysts through the reaction space, employing a reactor of the general type described and illustrated in U. S. Patent 1,799,858.

It will also be evident that in lieu of employing one reaction zone we may employ a plurality of reaction zones through which the reactants are passed in parallel, series or series-parallel, with intermediate separation of synthesized products from the reactant streams between passes through the reaction zones.

The hydrocarbon products produced by the process of the present invention contain a substantial proportion of mono-olefinic hydrocarbons. As the above tabulation indicates, the $C_5$–$C_9$ fraction may contain about 50 to 70% of mono-olefinic hydrocarbons. In the polymerization of ethylene, propylene, 1- or 2-butenes or their mixtures, straight chain 1-olefin hydrocarbons form a substantial proportion of the polymer product. Acid-catalyzed polymerization, especially of propylene or butylenes, normally leads to the production of branched-chain polymers. It is also noteworthy that the conversion of ethylene by the present process yielded only small proportions of dimer under the selected conditions and substantial yields of trimer and tetramer.

The hydrocarbon conversion product of the present invention may be subjected to a variety of aftertreatments or conversion operations. The hydrocarbon product is customarily distilled to separate fractions of desired boiling range and unsaturation. A relatively small proportion of water and oxy compounds contained in the hydrocarbon product may be removed by treatment of the product with suitable adsorbent materials such as activated carbon, silica gel, acid-treated clays or the like, optionally in the vapor phase, as in the treatment of Fischer-Tropsch hydrocarbon products containing oxygenated organic compounds. The hydrocarbon products of the present invention may also be subjected to contact with alkaline earth metal oxides at high temperatures, for example from about 100 to about 300° C., in order to dehydrate oxy compounds contained in said product and to increase the yield of hydrocarbons, especially olefins, derivable from the present process.

Since the olefinic products produced by our invention, especially by the treatment of normally gaseous non-tertiary olefins, boil substantially within the boiling range of gasoline and comprise a substantial proportion of straight-chain 1-olefin hydrocarbons, they are especially valuable starting materials for the preparation of synthetic lubricating oils and diesel engine fuels. The products of our invention or unsaturated fractions thereof boiling within the gasoline boiling range may be subjected to polymerization with relatively weak acid-acting catalysts, such as $BF_3$, sulfuric acid, phosphorus acids, and $SnCl_4$ to produce, after hydrogenation, paraffinic hydrocarbons of essentially straight-chain structure which are highly useful as high-speed diesel engine fuels. Stronger acid catalysts such as aluminum chloride, HF and HF—$BF_3$ may be used to produce synthetic polymers which are suitable for use as lubricating oils. Suitable polymerization processes, for example, are those which have been described in U. S. Patent 2,079,857 of Vanderveer Voorhees, which issued May 11, 1937. Other suitable polymerization procedures employing aluminum chloride as a catalyst and naphtha as the diluent have been described by F. W. Sullivan, Jr., V. Voorhees, A. W. Neeley and R. V. Shankland in Ind. Eng. Chem. 23, 604 (1931).

We have observed that the polymerization of 1-octene with 2.6 weight percent of $BF_3$ for 105 minutes at 57° F. produced 90 weight percent of polymer, 96 percent by weight of which boiled within the diesel fuel boiling range. The trimer fraction of this polymer had a cetane number of 64. Hydrogenation of the polymer yielded hydrotrimers having a cetane number of 76 and hydrodimers and hydrotetramers having a cetane value of 69. The hydrogenated polymer contained substantially no unsaturation and its pour point was below about −60° F. Thus, it will be apparent that the combination of iron-catalyzed olefin polymerization to produce an essentially straight-chain polymer boiling within the gasoline boiling range followed by acid-type polymerization of the polymer produces valuable high-boiling polymers which can not be obtained by the employment of either the metal-catalyzed or acid-catalyzed polymerization reactions alone.

Although we have described the conversion of the hydrocarbon products produced by the process of the present invention into synthetic lubricating oils and diesel engine fuels, it will be appreciated that the utility of the present products is not thus limited. It will be apparent that the olefinic and paraffinic hydrocarbons produced by the present process are suitable charging stocks for numerous chemical conversions to produce derivatives such as alcohols, ketones, esters and the like. Acidic catalysts effect polymerization of the straight-chain, gasoline boiling range mono-olefinic hydrocarbons, derived from the conversion of normally gaseous, non-tertiary mono-olefins, carbon monoxide and hydrogen with iron catalysts as herein described, to dimers and trimers containing between about 12 and about 16 carbon atoms, which may be sulfonated with strong sulfuric acid, chlorosulfonic acid, or other halogen sulfonic acids to produce straight chain alkyl sulfonates which are of great value as synthetic detergents and wetting agents. Alternatively, the olefinic products prepared by the combination of iron-catalyzed and acid-catalyzed polymerization processes may be employed for the alkylation of aromatic hydrocarbons, particularly benzene, toluene, xylenes, ethylbenzene or the like, to product mono-alkylates which upon sulfonation and neutralization with caustic or the like yield valuable alkylaryl sulfonates.

Having thus described our invention what we claim is:

1. A process for the conversion of an olefin, carbon monoxide and hydrogen to a hydrocarbon containing more carbon atoms per molecule than said olefin, which process comprises contacting a feed stock comprising said olefin and between about 5 and about 40 percent by volume of a mixture of hydrogen and carbon monoxide having a mol ratio of hydrogen to carbon monoxide between about 0.5 and about 10 with an alkali-promoted iron catalyst at a temperature between about 350° C. and about 425° C., and a pressure greater than 250 but less than 1500 p. s. i. g., and separating a synthesis product.

2. A process for the conversion of an olefin, carbon monoxide and hydrogen to a hydrocarbon containing more carbon atoms per molecule than said olefin, which process comprises contacting a feed stock comprising said olefin and between about 15 and about 30 percent by volume of a mixture of hydrogen and carbon monoxide having a mol ratio of hydrogen to carbon monoxide between about 1 and about 5 with an alkali-promoted iron catalyst at a temperature between about 375 and 400° C., and a pressure between about 500 and about 1000 p. s. i. g.

3. A process for the conversion of a normally gaseous non-tertiary olefin, carbon monoxide and hydrogen to a hydrocarbon containing more carbon atoms per molecule than said olefin, which process comprises contacting said olefin and between about 15 and about 30 percent by volume of a mixture of hydrogen and carbon monoxide having a mol ratio of hydrogen to carbon monoxide between about 1 and about 5 with an alkali-promoted iron catalyst at a temperature between about 375 and 400° C., and a pressure between about 500 and about 1000 p. s. i. g.

4. A process for the conversion of ethylene, carbon monoxide and hydrogen to a predominantly straight chain, normally liquid olefinic hydrocarbon product boiling substantially within the gasoline boiling range, which process comprises contacting a feed stock comprising ethylene and between about 5 and about 40% by volume of a mixture of hydrogen and carbon monoxide having a mol ratio of hydrogen to carbon monoxide between about 0.5 and about 10 with an alkali-promoted iron catalyst at a temperature between about 350° C. and about 425° C., and a pressure greater than 250 but less than 1500 p. s. i. g. and separating said hydrocarbon product.

5. A process for the conversion of ethylene, carbon monoxide and hydrogen to a predominantly straight chain, normally liquid olefinic hydrocarbon product boiling substantially within the gasoline boiling range, which process comprises contacting a feed stock comprising ethylene and between about 15 and about 30 percent by volume of a mixture of hydrogen and carbon monoxide having a mol ratio of hydrogen to carbon monoxide between about 1 and about 5 with an alkali-promoted iron catalyst at a temperature between about 375 and 400° C., and a pressure between about 500 and about 1000 p. s. i. g.

6. A process for the conversion of ethylene, carbon monoxide and hydrogen to a predominantly straight chain, normally liquid olefinic hydrocarbon product boiling substantially within the gasoline boiling range, which process comprises contacting a feed stock comprising ethylene and about 30 percent by volume of a mixture of hydrogen and carbon monoxide having a mol ratio of hydrogen to carbon monoxide of about 4 with an alkali-promoted iron catalyst at a temperature of about 400° C. and a pressure of about 1000 p. s. i. g.

7. A process for the conversion of propylene, carbon monoxide and hydrogen to a predominantly straight chain, normally liquid olefinic hydrocarbon product boiling substantially within the gasoline boiling range, which process comprises contacting a feed stock comprising propylene and between about 5 and about 40% by volume of a mixture of hydrogen and carbon monoxide having a mol ratio of hydrogen to carbon monoxide between about 0.5 and about 10 with an alkali-promoted iron catalyst at a temperature between about 350° C. and about 425° C., and a pressure greater than 250 but less than 1500 p. s. i. g. and separating said hydrocarbon product.

8. A process for the conversion of a normal butene, carbon monoxide and hydrogen to a predominantly straight chain, normally liquid olefinic hydrocarbon product boiling substantially within the gasoline boiling range, which process comprises contacting a feed stock comprising a normal butene and between about 5 and about 40% by volume of a mixture of hydrogen and carbon monoxide having a mol ratio of hydrogen to carbon monoxide between about 0.5 and about 10 with an alkali-promoted iron catalyst at a temperature between about 350° C. and about 425° C., and a pressure greater than 250 but less than 1500 p. s. i. g. and separating said hydrocarbon product.

9. A process for the conversion of ethylene, carbon monoxide and hydrogen to a predominantly straight-chain, normally liquid olefinic hydrocarbon product boiling substantially within the gasoline boiling range, which process comprises contacting a feed stock comprising ethylene and between about 15 and about 30 percent by volume of a mixture of hydrogen and carbon monoxide having a molar ratio of hydrogen to carbon monoxide between about 1 and about 5 with an iron catalyst promoted with about 0.5% potassium oxide at a temperature between about 375° C. and about 400° C. and a pressure between about 750 and about 1500 p. s. i. g. and separating said normally liquid olefinic hydrocarbon product from the product stream leaving the contacting step.

BERNARD L. EVERING.
EDWIN F. PETERS.

REFERENCES CITED

The following references are of record in the file of this patent:

UNITED STATES PATENTS

| Number | Name | Date |
|---|---|---|
| 1,812,372 | Ramage | June 30, 1931 |
| 1,984,884 | Lazier | Dec. 18, 1934 |
| 2,242,836 | Ramage | May 20, 1941 |
| 2,327,066 | Roelen | Aug. 17, 1943 |
| 2,414,276 | Sensel et al. | Jan. 14, 1947 |
| 2,440,109 | Moore | Apr. 20, 1948 |
| 2,443,673 | Atwell | June 22, 1948 |